United States Patent
Lenosky (10) Patent No.: US 6,956,917 B2
(45) Date of Patent: Oct. 18, 2005

(54) METHOD AND APPARATUS FOR REDUCING INTERFERENCE IN AN OPTICAL DATA STREAM USING DATA-INDEPENDENT EQUALIZATION

(75) Inventor: Thomas J. Lenosky, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 196 days.

(21) Appl. No.: 10/419,023

(22) Filed: Apr. 17, 2003

(65) Prior Publication Data

US 2004/0208266 A1 Oct. 21, 2004

(51) Int. Cl.[7] .............................. H04B 1/10; H03H 7/30
(52) U.S. Cl. ........................................ 375/350; 375/232
(58) Field of Search ................................. 375/232, 346, 375/350, 234, 229, 340, 355, 285; 708/303, 300, 322, 323; 359/161.189

(56) References Cited

U.S. PATENT DOCUMENTS 5,572,552 A * 11/1996 Dent et al. .................. 375/343

OTHER PUBLICATIONS

*Numerical Recipes in Fortran 77: The Art of Scientific Computing, Second Edition,* William H. Press, Saul A. Teukolsky, William T. Vetterling, and Brian P. Flannery, Cambridge University Press: Cambridge, UK (1992), pp. 340–386 and pp. 387–448.

*Matrix Computations, Third Edition,* Gene H. Golub and Charles F Van Loan, The Johns Hopkins University Press: Baltimore, MD (1996), pp. 87–132, pp. 193–205, and pp. 508–554.

*Digital Communication, Second Edition,* Edward A. Lee and David G. Messerschmitt, Kluwer Academic Publishers: Boston, MA (1994), pp. 737–764.

* cited by examiner

*Primary Examiner*—Tesfaldet Bocure
(74) *Attorney, Agent, or Firm*—Workman Nydegger (57) ABSTRACT

An optoelectronic assembly for reducing interference in an optical data stream received over a channel includes a converter, an equalizer, a microcontroller, and a comparator. The converter converts the optical data stream to an electrical signal. The equalizer, including a set of filter coefficients, filters the electrical data stream and generates a filtered signal. The comparator compares the filtered signal against a threshold value to generate a set of data values. The microcontroller includes: logic for generating one or more correlation statistics, where each correlation statistic reduces data components of the electrical signal; logic for estimating a channel response reflecting dispersion in the channel, based at least in part on the one or more correlation statistics; logic for determining the set of filter coefficients for the equalizer; and logic for adaptively updating the set of filter coefficients to reflect time-varying changes in the channel response.

19 Claims, 4 Drawing Sheets

METHOD AND APPARATUS FOR REDUCING INTERFERENCE IN AN OPTICAL DATA STREAM USING DATA-INDEPENDENT EQUALIZATION

The present invention relates to reducing interference in an optical data stream, and more particularly, to a system and method for reducing interference by equalizing an optical data-stream with an adaptive equalizer that does not rely on a training sequence.

BACKGROUND OF THE INVENTION

Transmission of data over long distances of optical fiber is limited by interference, such as from multimode dispersion, which limits the usable bandwidth of the fiber. Different modes in a multimode fiber travel at different velocities, which can cause a transmitted signal to be unrecoverable without errors by a standard transceiver. This is particularly problematic for fiber optic systems operating at high data rates over long distances—for example, for fiber for 1310 nm light with 10 Gb/s communications over a distance of 300 m. For this type of system, the usable distance may lie in the range of 60 to 100 meters. But, this is far short of the IEEE standard for 10 Gb Ethernet which, under the IEEE 802.3ae standard, specifies a distance of 300 m for multimode fiber.

At an optical receiver on a multimode fiber, the received signal s(t) looks like a convolution of the originally-transmitted signal, r(t), and a channel response h(t). The channel response represents the distortion to a pulse caused by the channel (including the transmitter, fiber, and detector), and is assumed to have a finite duration. Thus, if the channel response can be removed or filtered from the received signal, the originally-transmitted signal can be recovered. However, one particular complication of determining the channel response is that it is time variant, with a time constant thought to be one millisecond or greater (but not known exactly). The channel response variation results from interference between different modes of the fiber, and is caused by, for example, motion of the fiber or thermal variations along the fiber's length. Also, because fibers are often installed in the ceiling of office buildings, they are generally bent around ventilation ducts, which can lead to the coupling of different modes.

One way to reduce interference from dispersion, like multimode fiber dispersion, is by using an equalizer, which works to filter out channel effects in a signal. Because the channel effects of multimode dispersion are time-varying, an adaptive equalizer that continuously adjusts for the changes in h(t) must be used. One problem of an adaptive equalizer, however, is that it must be initialized with initial filter coefficients to recover the data clock and to converge on the data signal. This generally requires a training sequence (e.g., a sequence of known data) before the start of data communications. Requiring a training sequence presents an interoperability problem, however, because a transmitter in a device might not know it needs to send a training sequence before initiating communications.

One example of an adaptive feedback equalizer is a decision-feedback equalizer (DFE), which filters the incoming signal and compares it to a threshold value to drive the received signal to a high or a low value. A DFE can be implemented in digital logic, analog circuitry, or a hybrid of both. For example, one way to implement a DFE is to place a high speed (e.g., 10 Gb/s) analog-to-digital (A/D) converter in the signal path, followed by a custom-designed digital circuit to perform signal processing. The key disadvantage of this approach is high power consumption—e.g., an A/D converter at this speed typically requires at least one watt of power, and the digital circuitry typically requires another watt. This high-power consumption precludes the use of this approach in most datacom transceivers.

Another approach for implementing a DFE is to use a complete analog solution with no digital circuitry. In this approach, the LMS algorithm can be used to update tap weights in an analog fashion, storing the values on capacitors and using analog multipliers. There are several disadvantages to this approach, however. First, since the amount of analog circuitry required is extensive, the overall design project becomes complex and prone to error. Second, and more intractable, is the problem of false lock, or failure to converge, without the use of a training sequence. And, the use of a training sequence causes the interoperability problem mentioned above.

Finally, there are hybrid analog-digital approaches to DFEs that still utilize the LMS algorithm or similar techniques. For example, a digital circuit can update tap weights for an analog equalizer in the signal path. The digital circuit in this approach would use the LMS algorithm, with updating information obtained from strategically-placed A/D converters. The tap weights are provided back to the analog filter by digital-to-analog (D/A) converters. While this implementation avoids the high-power problems of the pure-digital approach and the design complexity of the pure-analog approach, there is still the vexing problem of obtaining convergence without a training sequence.

Thus, it would be desirable to provide a hybrid digital-analog adaptive equalizer that can adaptively determine and filter out channel effects, but which does not require a training sequence to initiate communications (i.e., it is data-independent).

SUMMARY OF THE INVENTION

In one embodiment, the present invention is a method for reducing interference in an optical data stream received over a channel. The method includes receiving an electrical signal derived from the optical data stream, and computing a set of time-correlation statistics from the electrical signal, which reduce data components of the electrical signal. Next, a channel response is estimated, at least in part from the set of time-correlation statistics, which contains dispersion information for the channel. Then, a set of filter coefficients for an adaptive equalizer are calculated, at least in part from the channel response. The electrical signal is filtered using the set of filter coefficients to create a filtered signal. Finally, the filtered signal is compared to a threshold value to generate a set of data values for the optical data stream.

In another embodiment, the present invention is an optoelectronic assembly for reducing interference in an optical data stream received over a channel. The optoelectronic assembly includes a converter, an equalizer, a microcontroller, and a comparator. The converter converts the optical data stream to an electrical signal. The equalizer filters the electrical data stream and generates a filtered signal. Also, the equalizer has a set of filter coefficients. The comparator compares the filtered signal against a threshold value to generate a set of data values for the optical data stream.

The microcontroller includes logic for generating one or more correlation statistics for the electrical signal, where each correlation statistic reduces data components of the electrical signal. Also, the microcontroller includes logic for estimating a channel response reflecting dispersion in the channel, where the estimated channel response is based at least in part on the one or more correlation statistics. Further, the microcontroller has logic for determining the set of filter coefficients for the equalizer. Finally, the microcontroller includes logic for adaptively updating the set of filter coefficients for the equalizer to reflect time-varying changes in the channel response.

BRIEF DESCRIPTION OF THE DRAWINGS

Additional objects and the features of the invention will be more readily apparent from the following detailed description and appended claims when taken in conjunction with the drawings, in which:

DETAILED DESCRIPTION OF THE PREFERRED EMBODIMENTS

In this description, the term "subset" is used generally to mean a portion of something, up to and including the entirety of the something.

A. Mathematical Model of the Fiber Transmission System

Figure 1A:
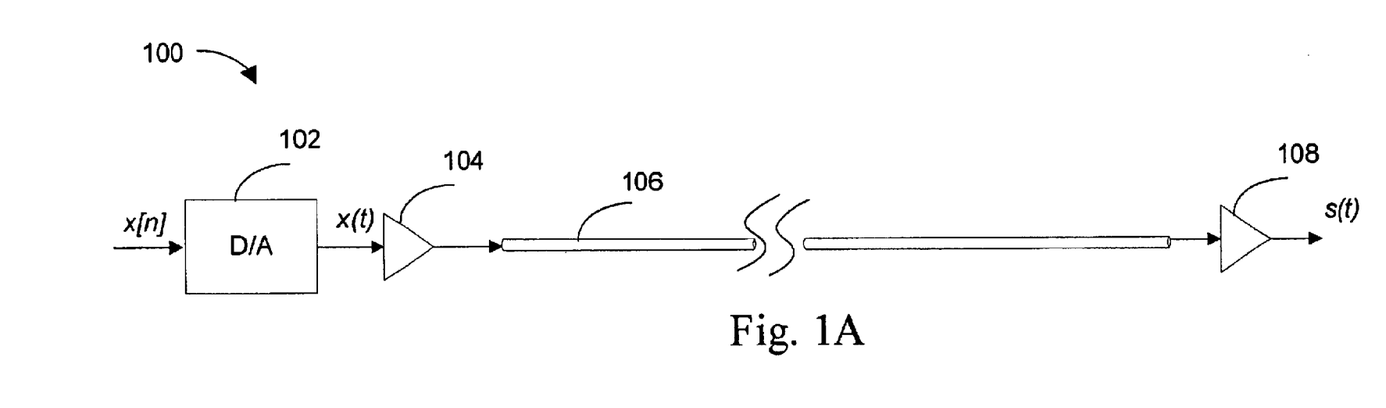
FIG. 1A is a block diagram of a multimode optical transmission system.

Referring to FIG. 1A, a typical multimode optical transmission system 100 includes a digital-to-analog (D/A) converter 102, a transmission amplifier 104, a multimode fiber 106, and a receiver 108. An input bit sequence x[n] is provided to the D/A converter 102, which converts the sequence to an input signal x(t). The transmission amplifier 104 transmits the input signal on the multimode fiber. At the receiving end of the system, the receiver 108 determines an output signal s(t). Ideally, the input bit stream x[n] can be unambiguously recovered from this output signal s(t). In practice, however, this is difficult due to the distorting effects of amplification by amplifier 104, propagation through fiber 106, and reception by receiver 108 of x(t).

Figure 1B:
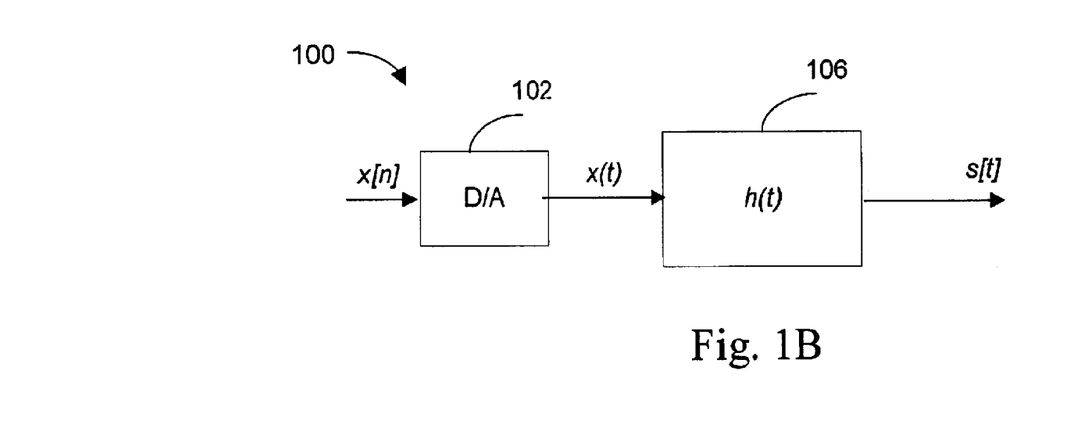
FIG. 1B is a block diagram of a mathematical representation of the transmission system of FIG. 1A.

To determine a mathematical model of the transmission system, it is convenient to group the effects of all distortion into one block. In digital signal processing, an abstract block, known as a "channel" is used to model the distorting effects of the transmission system (i.e., corresponding to the channel response discussed above). FIG. 1B depicts such a mathematical model of the multimode optical transmission system 100 of FIG. 1A. Channel 106 replaces the amplifier, fiber, and receiver of the transmission system. It is assumed that channel 106 introduces linear distortion only, so that the channel can be completely characterized by the channel impulse response h(t). As discussed, the channel impulse response may vary over time due to, among other possible causes, kinks in the fiber, temporal variations of the fiber, and fluctuations in power supply levels of the transmitter and/or receiver.

As is well known in the art of digital-signal processing (DSP), output signal s(t) is determined as a convolution of the input signal x(t) and the channel impulse response h(t). Mathematically, this relationship can be expressed as:

$$s(t) = x(t) * h(t) = \int_0^\infty x(s)h(t-s)ds$$

If the channel response is known, the output signal can be employed to produce an accurate estimate of the input signal x(t) and, in turn, the input bit stream x[n]. In practice, however, it is difficult to determine the channel response, especially because it is typically time-varying.

Many well-known techniques exist for the determination of the channel response. For example, the LMS and RLS techniques can be used to model the channel response. All of these techniques, however, require that a known training sequence be injected into input bit stream x[n]. This causes that the transmission system to be unavailable for data transmission for some period of time, diminishing the capacity of the system. Furthermore, there is the above-mentioned issue of interoperability, where any given transmitter may not know it needs to transmit the training sequence to begin with, and thus the system may never initialize to begin successful transmission.

B. Circuit Layout of Channel-Compensating Equalizer

Figure 2:
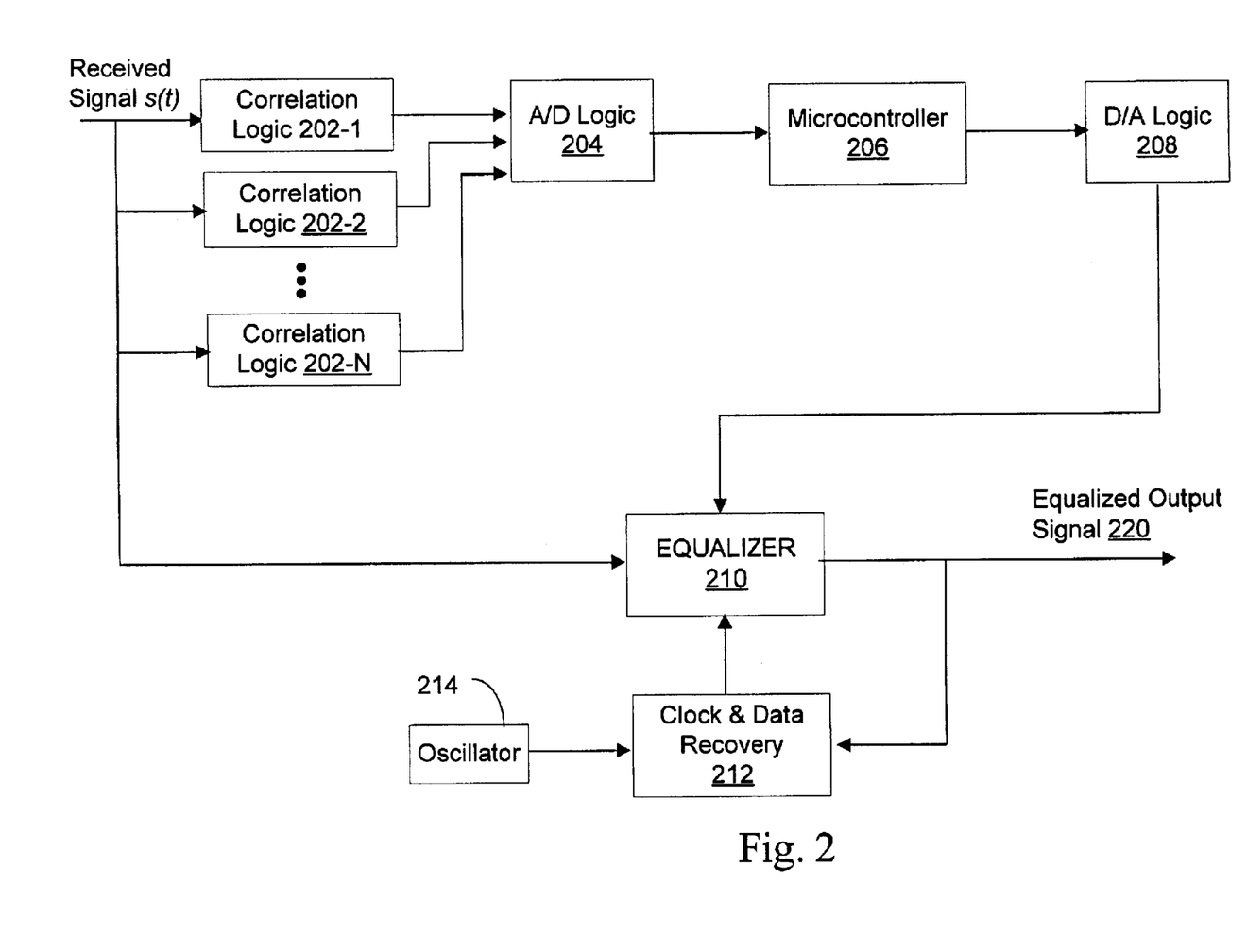
FIG. 2 is a block diagram of an adaptive channel-compensating equalizer, in accordance with an embodiment of the present invention.

Before explaining the functionality of the present invention, a block diagram for one embodiment of the channel-compensating equalizer of the present invention is presented in FIG. 2. As shown in this figure, the incoming signal s(t) is provided as an input to correlation logic blocks 202-1,2 . . . N to perform signal analysis, as will be explained in further detail below. (While three correlation logic blocks are shown, there may be as few as one, or as many as a multitude of different blocks, depending on the specific configuration of the equalizer designed by one of skill in the art). The correlation logic blocks are preferably implemented in analog logic, but in other embodiments, may also be implemented in digital logic, or in a combination of analog and digital logic. Using analog computational logic allows the signal analysis to occur at a faster speed than with digital processing, and requires less power as well.

An example of the type of computation that a correlation logic block might perform is: $S_1 = <s(t) \; s(t+\delta t)^4> - <s(t)><s(t)^4>$. To compute this type of a correlation function, the correlation logic utilizes a delay line (to compute the term that includes the delay $\delta t$), multipliers to multiply terms together to achieve powers, and capacitors to integrate the time-average of the functions. Of course, other types of computational logic may also be used to compute the same function, as appreciated by one of skill in the art. Further, a variety of different types of correlation functions are employed by the present invention.

The output of the correlation logic blocks is provided to A/D logic 204, which may be a single A/D converter, or multiple A/D converters in parallel. The digital samples of the correlation functions are then provided as an input to microcontroller 206, which deduces enough information from these functions to predict the channel response h(t). The microcontroller then uses the channel response h(t) to generate an initial set of filter coefficients, or tap weights, for the equalizer 210 to compensate for the effects of the channel response. Also, the microcontroller tracks the time-varying aspects of the channel response, and adaptively updates the filter coefficients of the equalizer. Thus, the clock rate of the microcontroller can be slower than the sample rate for the data signal s(t), as long as it is fast enough to provide appropriate adaptive updates to the equalizer 210.

Because the equalizer 210 is an analog equalizer using analog tap weights (in one embodiment), the microcontroller output must be converted to an analog signal by D/A logic 208, which may be a single D/A converter, or multiple D/A converters in parallel. (The determination and application of the tap weights to the equalizer 210, as well as the configuration of the equalizer 210, will be discussed in further detail below in conjunction with FIG. 4).

The data clock is recovered by clock and data recovery (CDR) circuit 212. Local oscillator 214 provides the clock signal. While a CDR circuit typically extracts the data clock from the received signal s(t), in one embodiment of the present invention, the CDR circuit 212 extracts the clock from the equalized output signal 220. This is possible because the equalizer 210 does not obtain convergence or data lock through an error-feedback adaptive algorithm, but rather from the compensation of the channel response by the microcontroller. By determining the data clock from the equalized signal, clock recovery is easier and more likely to compatible with an "off-the-shelf" CDR circuit, and also reduces the likelihood of false lock.

The equalizer 210 receives the input signal s(t) as its input, equalizes the signal, and outputs the equalized output signal 220, which is substantially similar to the originally-transmitted signal r(t).

As shown, operation of the channel-compensating equalizer of the present invention can be divided into two main steps: (1) determining the channel response of the channel over which the received signal is obtained; and (2) using the channel response to determine a set of filter coefficients for the equalizer to filter out the effects of the channel response to recover the originally-transmitted signal. Different techniques for implementing each step, in conjunction with different embodiments of the present invention, will be described next. The next two sections describe exemplary techniques for determining the channel response for step (1) (i.e., a "peak detection method" and an "explicit model-fitting method"), followed by an explanation of how to use the channel response to determine the set of filter coefficients, and how to adaptively update the coefficients, for step (2).

C. Channel Response Estimation: Peak Detection Method

To determine the channel response of a channel without requiring a training sequence, one embodiment of the invention computes correlation statistics of the output signal s(t) that are used to determine an estimate $\hat{h}(t)$ of the true channel response, without direct knowledge of any portion of the input bit stream. This embodiment builds a model of the channel response based on Gaussian peaks (or other peak shapes), and then uses the correlation statistics to determine the relative spacing and height of those peaks.

In this embodiment, a series of correlation statistics are computed based on s(t). Correlation functions are a measure of the similarity between two signals as a function of time shift between them. Correlation is at a maximum when two signals are similar in shape and in phase (or "unshifted" with respect to each other). In one embodiment, the correlation statistics are autocorrelation functions. Autocorrelation functions are correlations of a signal onto itself. By using autocorrelation functions, any uncorrelated data will drop out of the autocorrelation, or will be represented primarily as a spike that can be filtered out or ignored. In other words, the autocorrelation reduces the data components of the received signal. The remaining information in the autocorrelation will represent the largely periodic channel response.

In a large volume of data, it can be assumed that the transmitted data is uncorrelated, in part because a typical optoelectronic transmission system for multimode fiber utilizes a scrambler on the transmitter portion to assure that the transmitted data is substantially random. Also, the ratio of framing bits to payload bits is generally small enough that the framing bits can be compensated for by the microcontroller 206, or, in some applications, may have sufficiently minimal effect as to be ignored.

Figure 3A:
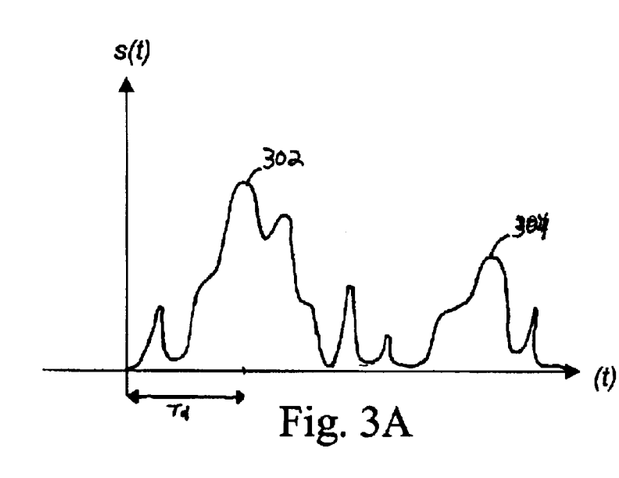
FIG. 3A shows an exemplary received signal.

Referring to FIG. 3A, an example of an output (received) signal s(t) is shown. This output signal represents the received signal after transmission of a single data pulse (representing a logic-high value) transmitted across the channel. Looking ahead to FIG. 3D, the corresponding recovered channel response h(t) (which will be determined in the manner described below) is shown. Comparing the two, it is clear that the received signal s(t) contains additional noise other than the channel response itself. If there were no dispersive effects other than those represented by the channel response, the output signal corresponding to a pulse could be measured directly to determine h(t). But, as shown, there may be other random noise in the channel, or the channel responses corresponding to other nearby pulses may crowd into the current channel response. In addition, because of the assumption that the data is random, there is no way to know whether peaks seen in the signal are in response to a true "1" bit (i.e., a pulse), or are just other noisy effects of the channel during a "0" bit transmission.

Thus, the autocorrelation functions are used to distinguish the channel response contributions (which generally repeat and thus show up as correlations) from the random data (which generally fall out of the autocorrelation). In one embodiment, the following three autocorrelation functions (also referred to herein as "correlation statistics") are computed:

$$S_0 = <s(t)s(t+\delta t)> - <s(t)>^2$$

$$S_1 = <s(t)\sqrt{s(t+\delta t)}> - <s(t)><\sqrt{s(t)}>$$

$$S_2 = <\sqrt{s(t)}s(t+\delta t)> - <s(t)><\sqrt{s(t)}>$$

As described, these correlation statistics $S_0$, $S_1$, and $S_2$ do not depend explicitly on the input data sequence x[n]. Furthermore, taken together, they allow an accurate estimate response of the channel impulse response h(t) to be computed. Note that the notation "< >" means a time-average of the terms inside the brackets.

Importantly, the three correlation functions $S_0$, $S_1$, and $S_2$ illustrated are merely an example of the type of functions that can be used in accordance with the precepts of the present invention. For example, other non-linear terms can be used in place of the square-root function, such as a power function:

$$S_1 = <s(t)s(t+\delta t)^4> - <s(t)><s(t)^4>$$

$$S_2 = <s(t)^4 s(t+\delta t)> - <s(t)><s(t)^4>$$

Other types of correlation functions and statistics, completely different than those presented above, can also be used as well, so long as whatever functions are used, they have the effect of dropping the data out of the correlated function and revealing the channel response.

One of skill in the art will appreciate that s(t) may be sampled by an analog-to-digital (A/D) converter, the samples stored in a semiconductor memory, and the computations necessary to compute the above quantities carried out on a microprocessor. Alternatively, the correlation statistics can be computed using analog circuitry—for example, using analog-multiply circuits, analog circuits that measure a time average by built-up voltage on a capacitor, and analog circuits that determine square-root and power-law functions.

Figure 3B:
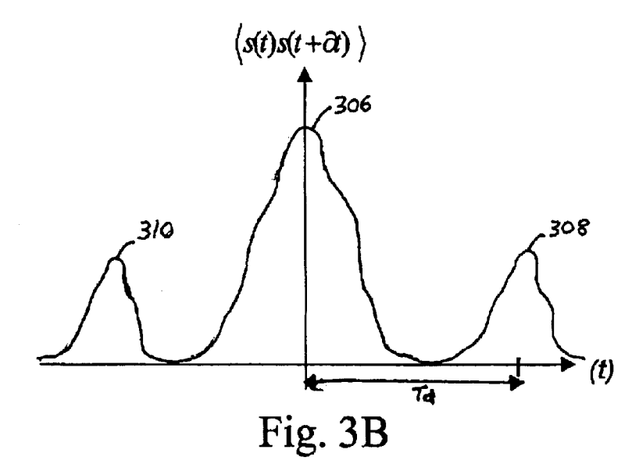
FIG. 3B illustrates a first correlation function of the received signal in FIG. 3A, in accordance with an embodiment of the present invention.
Figure 3C:
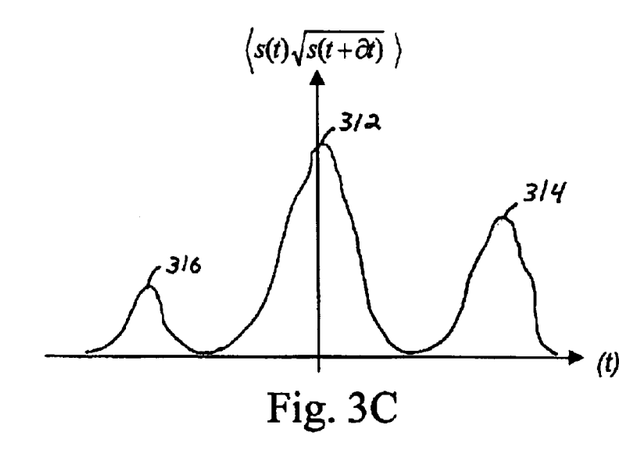
FIG. 3C illustrates a second correlation function of the received signal in FIG. 3A, in accordance with an embodiment of the present invention.
Figure 3D:
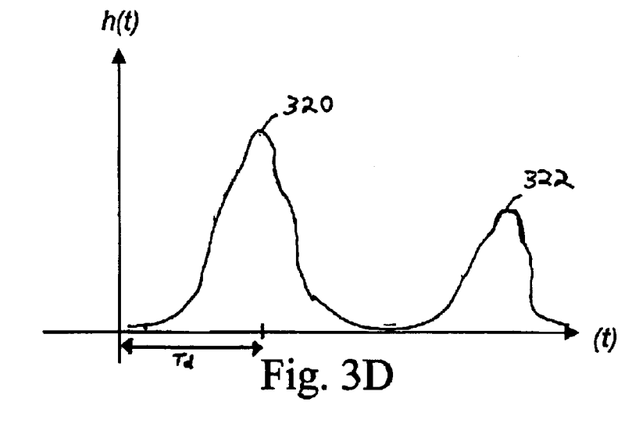
FIG. 3D shows an estimated channel response of the received signal in FIG. 3A determined by methods of the present invention.

In the present embodiment, it is assumed that the channel impulse response is characterized by a discrete number of peaks, as depicted by peaks 320 and 322 in FIG. 3D. Recall that in multimode fiber, different modes travel with different velocities down the fiber. This results in a delay, $T_d$, between the arrival of each mode at the receiving end of the fiber. (Hence, the x-axes of FIGS. 3A–3D are time t). This delay, as well as the relative heights of the two-peak (320 and 322) channel response, can be derived from the correlation statistics, as will be shown. Note that peaks 302 and peaks 304 of the received signal s(t) correspond to peaks 320 and 322; however, the received signal s(t) contains the additional aforementioned noise and convolved data.

Referring to FIG. 3B, correlation statistic $S_0$ exhibits three peaks. The central peak 306, centered around the x-axis, i.e., y=0, results from the computation of the correlation $S_0$ when there is no delay. In other words, $S_0$ is s(t) multiplied by itself. Thus, in accordance with the equation above, the height of peak 306 will be generally proportional to the square of the height of peak 302 (corresponding to channel-response peak 320) plus the square of the height of peak 304 (corresponding to channel-response peak 322). (Note that this is just an approximation, however, as other smaller peaks from noise will also be multiplied times themselves and added to the height of peak 306, but their effects substantially drop out with the other peaks, as well as with correlation statistics $S_1$, and $S_2$, as will be explained).

Peak 308 in $S_0$ results from the computation of correlation $S_0$ when the delay, δt, is equal to the intermode delay $T_d$. In this case, the height of peak 308 will be proportional to the height of peak 302 (corresponding to channel-response peak 320) multiplied by the height of peak 304 (corresponding to channel-response peak 322). This is because, after shifting s(t) over by $T_d$, peak 302 is multiplied by zero (or some small value approaching zero), peak 302 is multiplied by peak 304, and peak 304 is multiplied by zero (or some small value), resulting in a predominance of the product of peaks 302 and 304. The noise surrounding peaks 302 and 304 is assumed to be random (uncorrelated), and should effectively drop out because it will be multiplied by zero or a small number.

Peak 310 is equal in height to that of peak 308, as it results from the computation of correlation $S_0$ when the delay, δt, is equal to negative of the intermode delay $T_d$. Thus, no new information is gained from examining the position or height of peak 310.

The intermode delay $T_d$ can be determined by the distance between peaks 306 and 308, because peak 308 is positioned at δt=$T_d$. Also, there are two relationships known about the height of peak 320 ($h_{320}$) and the height of peak 322 ($h_{322}$) in the channel response, as they correspond to peaks in the correlation function $S_0$. These relationships can be expressed as:

$$h_{320}+h_{322}=h_{306}$$

$$h_{320}*h_{322}=h_{308}$$

However, these two equations are not sufficient by themselves to unambiguously determine the unknown quantities $h_{320}$ and $h_{322}$.

Thus, to uniquely determine the heights of the peaks in the channel impulse response, additional correlation statistics are considered. Referring to FIG. 3C, correlation statistic $S_1$ contains three main peaks 312, 314, and 316. Using logic similar to that outlined above in reference to $S_0$, the following three relationships can be determined about the peaks of the channel response and the peaks of the correlation statistic $S_1$:

$$h_{320}^{1.5}+h_{322}^{1.5}=h_{312}$$

$$h_{320}\sqrt{h_{322}}=h_{314}$$

$$h_{322}\sqrt{h_{320}}=h_{316}$$

What is not shown in these equations, however, is the fact that there is a baseline associated with each peak height in the equations, due to interference with neighboring bits due to the nonlinearlity (i.e., the square root function). However, the microcontroller (or other appropriate digital logic) of the present invention can compensate for the baseline effects, and thus these effects can effectively be ignored. Therefore, these three equations, together with the two equations above related to $S_0$, can be used to uniquely determine $h_{320}$ and $h_{322}$. Methods for the simultaneous solution of nonlinear equations are well known. See, e.g., Chapter 9, pp. 340–386, Numerical Recipes in Fortran 77: The Art of Scientific Computing, $2^{nd}$ Edition, William H. Press, Saul A. Teukolsky, William T. Vetterling, and Brian P. Flannery, Cambridge University Press, 1992, which is hereby incorporated by reference.

In summary, the procedure for extracting the peak heights/positions for the channel impulse response in the case where two modes are present in the fiber can be summarized as follows:

1. Determine the location of the three peaks in $S_0$;
2. Measure the heights of the largest peak 306 and the smaller peak 308;
3. Measure the heights of the three peaks 312, 314, and 316 in $S_1$; and
4. Determine the intermode delay $T_d$ and the height of the two peaks in the impulse response $h_{320}$ and $h_{322}$.

One of skill in the art will recognize that this procedure is easily generalized to the case of any number of peaks in the impulse response. The peaks can be modeled as a series of Gaussian peaks, for example, with a width corresponding to the pulse width of the received signal, and a height determined by the method described above. The actual number of peaks used for the model can be a predetermined value, or can vary depending on the channel information. Also, while the above-described technique is one example of a method for determining the height and relative positioning of the peaks of the channel response h(t), other methods for determining the channel response can be employed in the present invention. For example, the channel response could be determined partially through measurement (for a pulse) and partially through correlation statistics. Or, the channel response can be determined through an explicit model-fitting procedure—a technique that will be described next.

D. Channel Response Estimation: Explicit Model-Fitting Procedure

In another embodiment, the present invention determines the channel response by computing models of correlation statistics of the output signal s(t), which are then iteratively optimized to determine coefficients that can be used to determine an estimate ĥ(t) of the true channel response. Again, this occurs without direct knowledge of any portion of the input bit stream.

In this embodiment, the output signal s(t) is first measured for some period of time $T_m$ and stored. Next, a series of correlation statistics are computed based on s(t). For example, in one embodiment, the following three correlation statistics are computed:

$$S_0 = \langle s(t)s(t+\delta t) \rangle - \langle s(t) \rangle^2$$
$$S_1 = \langle s(t)\sqrt{s(t+\delta t)} \rangle - \langle s(t) \rangle \langle \sqrt{s(t)} \rangle$$
$$S_2 = \langle \sqrt{s(t)} \, s(t+\delta t) \rangle - \langle s(t) \rangle \langle \sqrt{s(t)} \rangle$$

There are the same correlation functions $s_0$, $S_1$, and $S_2$ discussed above in the context of the peak detection method. Before explaining how these correlation functions are used to derive the channel response h(t) in this embodiment, it will be established that the correlation functions are data-independent, that is, that they reduce or eliminate the data components of the received signal 1. Data-Independence of Correlation Statistics.

This embodiment of the invention is understood more readily if the relationship between input data stream x[n] and the input signal x(t) is first considered in more detail. In some embodiments, input data sequence x[n] assumes one of only two values—logic high ($V_H$) or logic low ($V_L$), with a bit period of duration. In this case, x(t) can be expressed as the product of the input sequence convolved with a pulse train, $$x(t) = \sum_{n=0}^{\infty} x[n]p(t - nT_s)$$

The shape of the pulse function p(t) is produced by D/A 102 (see FIG. 1) and is known in practice.

With this description of the input signal, it is possible to express the output signal directly in terms of the input data sequence:

$$s(t) = x(t) * h(t) = \sum_{n=0}^{\infty} x[n]p(t-nT_s) * h(t) = \sum_{n=0}^{\infty} x[n]p(t-nT_s)$$

where q(t) is implicitly defined as the convolution of the pulse p(t) and the channel impulse response. (Note: throughout this document, references to the channel response h(t) may also be references to q(t), interchangeably, with an additional [and generally unnecessary] deconvolution required to derive the actual channel response. For ease of explanation, however, the discussion focuses on the channel response h(t) instead of the convolved channel response and pulse function q(t)).

Next, the correlation statistic $S_0$ can be expressed in terms of integrals:

$$S_0 = \langle s(t)s(t+\delta t) \rangle - \langle s(t) \rangle^2 = \int_{-\infty}^{\infty} s(t)s(t+\delta t)dt - \left( \int_{-\infty}^{\infty} s(t)dt \right)^2$$

Then, using the aforementioned expression for s(t), the first part of $S_0$ can be expressed as:

$$\langle s(t), s(t+\delta t) \rangle = \int_{-\infty}^{\infty} \sum_{n=0}^{\infty} x[n]q(t-nT_s) \sum_{m=0}^{\infty} x[m]q(t+\delta t - mT_s)dt$$

-continued
$$= \int_{-\infty}^{\infty} \sum_{n=0}^{\infty} x^2[n]q(t-nT_s)q(t+\delta t - mT_s)dt$$

$$= \sigma^2 \int_{-\infty}^{\infty} \sum_{n=0}^{\infty} q(t-nT_s)q(t+\delta t - mT_s)dt$$

where σ is the standard deviation of the input data stream (a known quantity), and it has been assumed that the input data stream is uncorrelated, as discussed previously. The second part of $S_0$, while not set forth here, is similar.

The important fact to glean from this analysis is that the expression for $S_0$ depends only on the standard deviation of the input sequence, the pulse function p(t), and the channel response h(t). Knowledge of the input sequence itself, x[n], is not required to compute $S_0$ via the above expression.

2. Estimate of Channel Response From Statistics

Because the correlation statistics are independent of the input data sequence x[n], the channel impulse response h(t) can be computed directly from these statistics. First, an estimated impulse response $\tilde{h}(t)$ is parameterized in terms of a finite number of unknown coefficients:

$$\tilde{h}(t) = \sum_{m=1}^{M} \lambda_m b_m(t)$$

In this expression, the m-basis functions $b_m(t)$ are known functions of time and the M expansion coefficients $\lambda_m$ are to be determined. Approximation of unknown functions by a finite number of basis functions is well-known in the art of numerical computation. For example, the basis function $b_m(t)$ could be cubic splines, Legendre polynomials, or wavelets. The basis functions $b_m(t)$ in this embodiment would be predetermined by the computational logic, and could be dynamically optimized.

The expansion coefficients $\lambda_m$ are determined by modeling the correlation statistics $\tilde{S}_0$, $\tilde{S}_1$, $\tilde{S}_2$ based on the expansion coefficients, using a curve-fitting optimization (e.g., a steepest-descent function) to determine the best coefficients, and, once determined, using the same coefficients to determine the model of the channel response. Each correlation statistic is first expressed in terms of the expansion coefficients:

$$\tilde{S}_0 = f_0(\lambda_1, \lambda_2, \ldots \lambda_M) = f(\lambda)$$

where the notation λ is a shorthand for the M-vector of the expansion coefficients. Other correlation statistics can be similarly estimated.

Next, an initial set of expansion coefficients $\lambda_m$ must be determined, to provide the initial model for each correlation statistic. In one embodiment, these initial values for the coefficients are predetermined by the computational logic (like the basis functions), and could, as one example, simply be set to zero. In another embodiment, the initial values for the expansion coefficients could be determined by the peak detection method described above. By comparing a model of the correlation statistics, based on the initial expansion coefficients, with the actual computed correlation statistics, the coefficients can be iteratively improved or optimized.

Thus, the actual correlation statistics must also be determined, by measuring the received signal s(t) (e.g., by sampling the signal with an A/D converter), and by computing the correlation statistics $\tilde{S}_0$, $\tilde{S}_1$, $\tilde{S}$ based on the equations described above. Then, to determine the optimal values of the expansion coefficients based on the knowledge of the actual correlation statistics, a scalar error function is defined:

$$E(\lambda) = \sum_{n=0}^{2} (S_i - \tilde{S}_i)^2$$

The purpose of the scalar error function is to denote the error between the actual correlation statistics and the modeled correlation statistics, summed over the total number of statistics (e.g., two in this case). Thus, by minimizing the value of the scalar error function, the modeled correlation statistics are optimally "fit" to the actual correlation statistics, and hence the optimal set of expansion coefficients is determined.

Minimization of error functions is well-known in the art of numerical analysis. For example, the steepest descent procedure can be used to minimize the error function. Alternatively, any other suitable type of numerical optimization may also be used. Other methods, including but not limited to simulated annealing and genetic algorithms, could also be used to minimize the error function. See Chapter 10, pp. 387–448, Press et al., which is hereby incorporated by reference.

In the steepest descent procedure, the best current estimate of the expansion coefficients are iteratively improved in accordance with the following relation:

$$\lambda^{i+1} = \lambda^i + \beta \nabla E(\lambda^i)$$

where i is the number of the current iteration, $\beta$ is a coefficient, and $\nabla$ denotes the gradient with respect to the expansion coefficients. The iterations can be stopped when the change in estimates of the expansion coefficients becomes small in some norm. This type of iterative calculation can be quickly conducted by a microprocessor, or by specialized digital circuitry in an alternative embodiment.

Finally, once the set of coefficients that best minimizes the error function is determined, the computational logic will use those coefficients, together with the basis functions $b_m(t)$, to determine the model of the channel response $\tilde{h}(t)$. By using these techniques, the modeled channel response $\tilde{h}(t)$ should be approximately equal to the actual channel response $h(t)$.

E. Design of Equalizing Filter

The second general step of the present invention is to apply the calculated channel response (whether determined by the peak detection method, by the model-fitting method, or by an alternative correlation technique) to obtain filter coefficients for the equalizer. In other words, the equalizer uses the channel response $h(t)$ to cancel out or reduce the effects of the channel response, and to equalize the received signal $s(t)$. In one embodiment of the present invention, adaptive equalization is performed by an infinite impulse response (IRR) equalizer with a minimum mean squared error (MMSE) filter.

Figure 4:
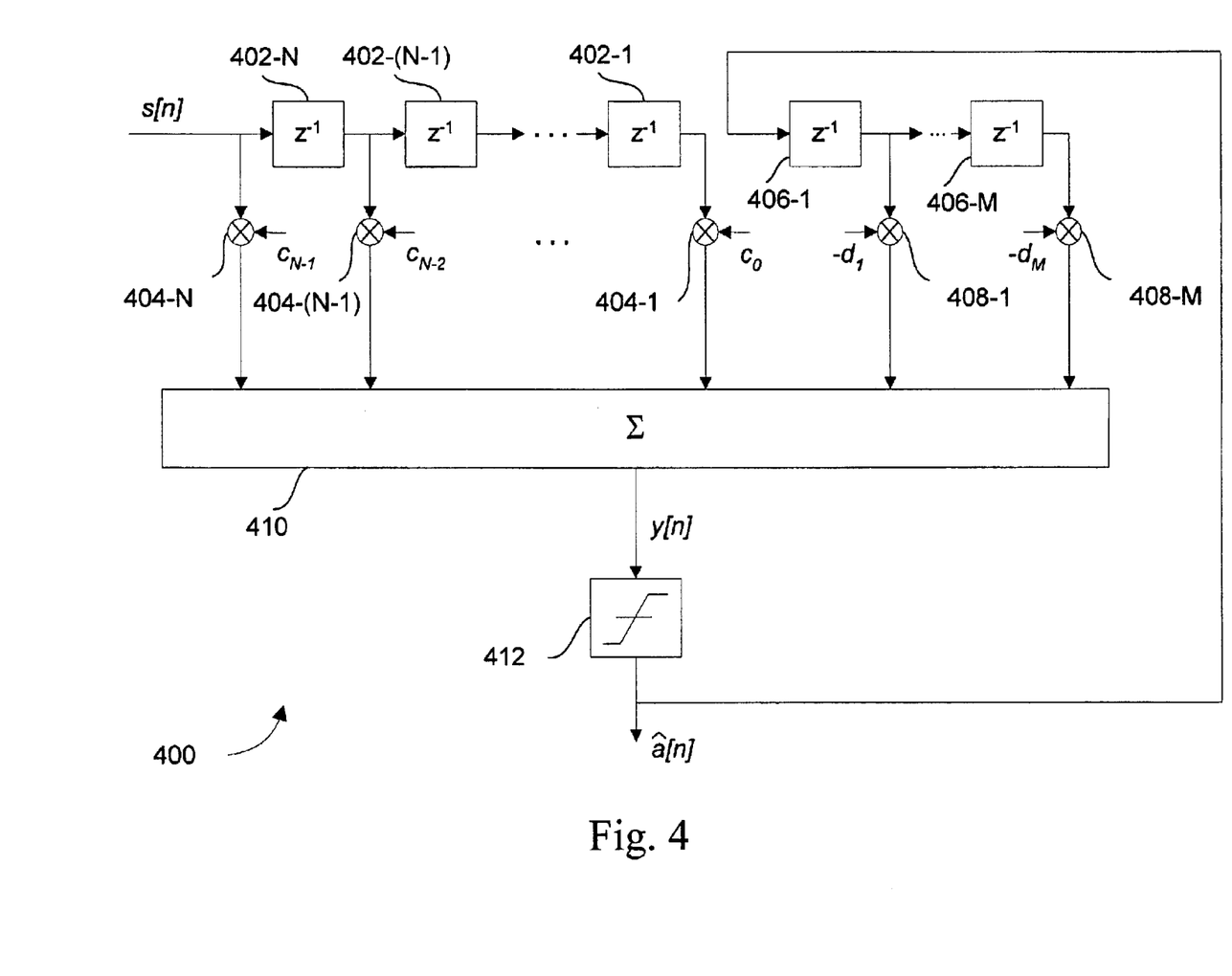
FIG. 4 is a block diagram of an infinite impulse response filter, in accordance with an embodiment of the present invention.

The IIR equalizer is designed to minimize the expected squared error between the estimate of the current data symbol $\hat{a}[n]$ and the true data symbol $a[n]$. The filter may be implemented purely in digital hardware, purely in analog hardware, or in a combination of analog and digital hardware. Referring to FIG. 4, IIR filter 400 includes:

- a number of one-bit delays 402-1 . . . N in an N-order precursor section for canceling intersymbol interference (ISI) from future data symbols;
- a number of coefficient multipliers 404-1 . . . N in the precursor section; precursor coefficients $c_0, c_1, \ldots, c_{N-1}$;
- a number of one-bit delays 406-1 . . . M in an M-order postcursor section for canceling intersymbol interference (ISI) from past data symbols;
- a number of coefficient multipliers 408-1 . . . M in the postcursor section;
- postcursor coefficients $d_1, d_2, \ldots, d_M$;
- summer 410 for combining the results of the pre- and postcursor filters; and
- slicer 412 for estimating the current data symbol based on the combined output of the precursor and postcursor filters.

The number of nonzero coefficients N in the precursor filter and the number of coefficients M in the postcursor filter impact both the cost and performance of the DFE in estimating the true data symbol. Generally, larger number of coefficients will lead to more accurate estimation of the true data symbol, but will be more expensive to implement in hardware. Conversely, smaller numbers of coefficients will generally lead to less reliable estimation of the true data symbol, while requiring a lower cost to implement in hardware. Examples of possible choices of N and M include N=8 and M=16, but there are always design tradeoffs that must be made in practice in selecting these values.

The actual number of coefficients in the precursor and postcursor sections of filter 400 are determined by a designer before construction of the filter, and do not change for a given implementation. On the other hand, the coefficients $c_0, c_1, \ldots, c_{N-1}$ and $d_1, d_2, \ldots, d_M$, are computed both before and during the operation of the filter. Computation of the coefficients is accomplished by the microcontroller 206 (see FIG. 2) with a routine that receives the current estimate of the channel response as an input, and returns the optimal (from a MMSE standpoint) coefficients as an output.

To more clearly explain the routine for determining optimal coefficients, the following notation is first defined:

$$h[n] = h(nT_s),$$

where n is an integer representing a sample number, $T_s$ is the sampling period (the arithmetical inverse of the data transmission rate), and $h(t)$ is the channel response. Allowing n=0 to refer to the first nonzero sample of the channel response, a vector of channel response samples is defined as:

$$h = \sigma_a^2 \begin{bmatrix} h[-(N-1)] \\ h[-(N-2)] \\ \vdots \\ h[0] \end{bmatrix},$$

where $\sigma_a$ is the standard deviation of the input data symbol sequence $a[n]$. It is also convenient to define the autocorrelation matrix of the received symbols, $$\Phi = \begin{bmatrix} \phi_{-(N-1),-(N-1)} & \phi_{-(N-1),-(N-2)} & \cdots & \phi_{-(N-1),0} \\ \phi_{-(N-2),-(N-1)} & & & \vdots \\ \vdots & & \ddots & \vdots \\ \phi_{0,-(N-1)} & \phi_{0,-(N-2)} & \cdots & \phi_{0,0} \end{bmatrix}$$

where the individual matrix elements are given by:

$$\phi_{j,m} = \sum_{k=-\infty}^{0} h[j+k]h[m+k] + \sum_{k=M+1}^{\infty} h[j+k]h[m+k]$$

Finally, the unknown coefficients of the precursor filter are denoted:

$$c = \begin{bmatrix} c_0 \\ c_1 \\ \vdots \\ c_{-N+1} \end{bmatrix}.$$

In observance of the notations defined above, the coefficients of the precursor filter that yield an MMSE behavior are:

$$c = (\Phi + \lambda I)^{-1} h \qquad \text{(Eq. A)}$$

(where I is the identity matrix and $\lambda$ is a small positive number to prevent zero eigenvalues in order to reduce divergence of the inverse matrix), with corresponding postcursor coefficients:

$$d_m = \sum_{i=-(N-1)}^{0} c_i h[m-i], \; 1 \leq m \leq M \qquad \text{(Eq. B)}$$

To solve the equations (A) and (B) for the various coefficients requires knowledge of the channel response and the exact autocorrelation statistics of the input data symbol sequence. This is where the first general step of the present invention, estimating the channel response, is pertinent. In accordance with the explanations above, the correlation statistics of the input data symbol sequence are determined (e.g., $S_0, S_1$, and $S_2$), and the channel response is estimated.

Then, with this information, the procedure for calculating the tap weights of the filter in one embodiment of the present invention is as follows:

1. Compute and store the N-vector $$\hat{h} = S_0(0) \begin{bmatrix} \hat{h}[-(N-1)] \\ \hat{h}[-(N-2)] \\ \vdots \\ \hat{h}[0] \end{bmatrix};$$

2. Compute and store the N-by-N matrix $$\hat{\Phi} = \begin{bmatrix} \hat{\phi}_{-(N-1),-(N-1)} & \hat{\phi}_{-(N-1),-(N-2)} & \cdots & \hat{\phi}_{-(N-1),0} \\ \hat{\phi}_{-(N-2),-(N-1)} & & & \vdots \\ \vdots & & \ddots & \vdots \\ \hat{\phi}_{0,-(N-1)} & \hat{\phi}_{0,-(N-2)} & \cdots & \hat{\phi}_{0,0} \end{bmatrix}$$

where each element is computed in accordance with the formula $$\hat{\phi}_{j,m} = \sum_{k=-\infty}^{0} \hat{h}[j+k]\hat{h}[m+k] + \sum_{k=M+1}^{0} \hat{h}[j+k]\hat{h}[m+k];$$

3. Solve the matrix equation $\hat{c} = (\hat{\Phi} + \lambda \hat{I})^{-1} \hat{h}$, yielding an approximation $\hat{c}$ of the optimal precursor tap weights; and 4. Compute an approximation of the optimal postcursor tap weights via the formula $$\hat{d}_m = \sum_{i=-(N-1)}^{0} \hat{c}_i \hat{h}[m-i], \; 1 \leq m \leq M.$$

To solve the matrix equation in step 3, methods for the solution of sets of linear equations are employed in one embodiment, such as lower-upper (LU) decomposition and back-substitution, conjugate gradient (CG) iteration, and generalized minimum residual (GMRES) iterations. See, generally, Chapter 3 and Chapter 10, Matrix Computations, 3$^{rd}$ Ed., G. H. Golub and C. F Van Loan, The Johns Hopkins University Press, Baltimore, Md., 1996, which are hereby incorporated by reference. One of skill in the art will recognize that the matrix $\hat{\Phi}$ is a Topelitz matrix. See, e.g., Section 4.7, pp. 193–205, Matrix Computations, 3$^{rd}$ edition, Gene H. Golub and Charles F. Van Loan, John Hopkins University Press, 1996. Thus, in one embodiment, the Levinson algorithm is employed to solve the matrix equation $\hat{c} = \hat{\Phi}^{-1} \hat{h}$. A pseudocode implementation of the Levinson algorithm is shown in Table 1:

TABLE 1

1. set $y_1 = -\hat{\phi}_1, \hat{c}_0 = \hat{h}[-(N-1)], \beta = 1, \alpha = -\hat{\phi}_1$
2. for k = 1 to N − 1 do $$\beta = (1 - \alpha^2)\beta; \mu = \left( \hat{h}[k+1-N] - [\hat{\phi}_1 \; \cdots \; \hat{\phi}_k] \begin{bmatrix} \hat{c}_{k-1} \\ \hat{c}_{k-2} \\ \vdots \\ \hat{c}_0 \end{bmatrix} \right) / \beta$$

$$v = \begin{bmatrix} \hat{c}_0 \\ \hat{c}_1 \\ \vdots \\ \hat{c}_{k-1} \end{bmatrix} + \mu \begin{bmatrix} y_k \\ y_{k-1} \\ \vdots \\ y_1 \end{bmatrix}$$

$$\begin{bmatrix} \hat{c}_0 \\ \hat{c}_1 \\ \vdots \\ \hat{c}_k \end{bmatrix} = \begin{bmatrix} v \\ \mu \end{bmatrix}$$

if k < N − 1 then $$\alpha = \left( -\hat{\phi}_{k+1} + [\hat{\phi}_1 \; \hat{\phi}_2 \; \cdots \; \hat{\phi}_k] \begin{bmatrix} y_k \\ y_{k-1} \\ \vdots \\ 1 \end{bmatrix} \right) / \beta$$

$$z = \begin{bmatrix} z_1 \\ z_2 \\ \vdots \\ z_k \end{bmatrix} = \begin{bmatrix} y_1 \\ y_2 \\ \vdots \\ y_k \end{bmatrix} + \alpha \begin{bmatrix} y_k \\ y_{k-1} \\ \vdots \\ y_1 \end{bmatrix}$$

$$\begin{bmatrix} y_1 \\ y_2 \\ \vdots \\ y_{k+1} \end{bmatrix} = \begin{bmatrix} z \\ \alpha \end{bmatrix}$$

end
end

In summary, given an estimate of the channel response (embodied by the channel impulse response coefficients $\hat{h}[0], \hat{h}[1], \ldots \hat{h}[N-1]$), and measurements of $S_0, S_1$, and $S_2$, the optimal tap weights of the IIR filter depicted in FIG. 4 can be determined.

One feature of the present invention is the ability to update the estimates of the tap weights based on changes in the estimate of the channel response. This is accomplished using a scheme for adaptive equalization, such as the following scheme, which performs adaptive equalization at a rate equal to the data symbol rate of the channel:
1. Retrieve the last unequalized data symbol s[n];
2. Update the estimate of the channel response ĥ[0],ĥ[1], . . . ĥ[N−1];
3. Calculate an estimate of the optimal precursor filter tap weights ĉ;
4. Calculate an estimate of the optimal postcursor filter coefficients d̂; and
5. Apply the new estimates of the optimal precursor and postcursor coefficients to the IIR filter.

In other embodiments, the above steps may be repeated at a rate of one-tenth, one-thousandth, or some other fractional speed, of the data symbol rate to allow sufficient time for the computation of new coefficients. As long as the equalizer is adaptive enough to be responsive to changing channel conditions, the microcontroller 206 can be slower than the sample rate, and hence utilize slower, less expensive, and less power-consumptive D/A and A/D converters.

Other variations constitute part of the present invention as well. For example, in one embodiment, the equalized and estimated data symbol â[n] is used as an estimate of the most recent data symbol transmitted into the channel. Further, the output y[n] is used to drive a timing recovery circuit (see FIG. 2) in one embodiment. Timing recovery circuits are well known in the art of digital signal processing (DSP). See Chapter 17, pp. 737–764, Digital Communication, Second Edition, Edward A. Lee and David G. Messerschmitt, Kluwer Academic Publishers, Boston, USA, 1994, which is hereby incorporated by reference. Additionally, in other embodiments, the equalizer may be a decision-feedback equalizer (DFE) that determines updated filter coefficients using an error signal determined from the differences in the pre- and post-slicer signals. Also, the DFE may optionally contain a finite impulse response (FIR) filter on its front end.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Appendix A

Notation

Throughout this document, the following notations are used:

E[x]—the statistical expectation, or mean, of random variable (r.v.)*x*. For a discrete r.v., the expectation can be explicitly evaluated via $$E[x] = \sum_j j P(x=j),$$

where the summation is performed over all possible values of the r.v. and P(x=j) denotes the probability that the r.v. assumes the value j.

$\sigma_x$—the standard deviation of r.v. x. For any r.v., the standard deviation can be explicitly evaluated via $\sigma_x = \sqrt{E[x^2] - E[x]^2}$.

<f (t)>—the time-average of a function $f(t)$. The time-average is explicitly given by $$\langle f(t) \rangle = \frac{1}{2T} \lim_{T \to \infty} \int_{-T}^{T} f(s) \, ds.$$

Note: Under some circumstances, the time-average is a good approximation of the expectation. For example, the function $f(t)$ can sometimes be expressed as the sum of a series of deterministic time functions whose amplitude is modulated by a discrete r.v., $$f(t) = \sum_n x_n p(t - nT_s),$$

where $x_n$ is an instance of the r.v. x, $T_s$ is a deterministic constant and p(t) is a deterministic function of time having zero time-average. In this case, the mean of the r.v. is well-approximated by E[x]≈<f(t)>.

A k-vector v is a k-tuple of values $v_1, v_2, \ldots, v_k$ and is denoted $$v = \begin{bmatrix} v_1 \\ v_2 \\ \vdots \\ v_k \end{bmatrix}.$$

An m-by-n matrix A is a n-tuple of m-vectors $a_1, a_2, \ldots a_n$ and is denoted $$A = \begin{bmatrix} a_{11} & a_{12} & \cdots & a_{1n} \\ a_{21} & \ddots & & \\ \vdots & & & \vdots \\ a_{m1} & & \cdots & a_{mn} \end{bmatrix}.$$

The inner product of two k-vectors v and w is computed as $$\sum_{i=1}^{k} v_i w_i$$

and is denoted $$\begin{bmatrix} v_1 \\ v_2 \\ \vdots \\ v_k \end{bmatrix} \begin{bmatrix} w_1 & w_2 & \cdots & w_k \end{bmatrix}.$$

The product of an n-by-k matrix A and a k-vector v is a n-vector w. The elements of w are computed in accordance with $$w_i = \sum_{l=1}^{k} a_{il} v_l.$$

This operation is denoted $$\begin{bmatrix} a_{11} & a_{12} & \cdots & a_{1k} \\ a_{21} & \ddots & & \\ \vdots & & & \vdots \\ a_{nl} & & \cdots & a_{nk} \end{bmatrix} \begin{bmatrix} v_1 \\ v_2 \\ \vdots \\ v_k \end{bmatrix}$$

or, alternately, Av.

The inverse of an m-by-m matrix A, when it exists and is unique, is another, possibly different m-by-m matrix denoted by $A^{-1}$. For arbitrary m-vectors v and w, if the matrix A satisfies w=Av its inverse must satisfy $v=A^{-1}w$.

What is claimed is:

1. A method for reducing interference in an optical data stream received over a channel, the method comprising:
   receiving an electrical signal derived from the optical data stream;
   computing a plurality of time-correlation statistics from the electrical signal that reduce data components of the electrical signal;
   estimating, at least in part from the plurality of time-correlation statistics, a channel response that contains dispersion information for the channel;
   calculating, at least in part from the channel response, a set of filter coefficients for an adaptive equalizer;
   filtering the electrical signal using the set of filter coefficients to create a filtered signal; and
   comparing the filtered signal to a threshold value to generate a plurality of data values for the optical data stream.

2. The method of claim 1, wherein the computing, estimating, and calculating are repeated in order to adaptively update the set of filter coefficients of the adaptive equalizer.

3. The method of claim 1, wherein the calculated set of filter coefficients are an initial set of coefficients, and wherein the adaptive equalizer converges using the initial set of coefficients without requiring a training sequence.

4. The method of claim 1, wherein the step of estimating the channel response is conducted by using the plurality of time-correlation statistics to determine spacing between, and amplitudes of, a plurality of modeled channel-response peaks.

5. The method of claim 1, wherein the step of estimating the channel response comprises:
   modeling the plurality of time-correlation statistics using a plurality of expansion coefficients;
   comparing the computed time-correlation statistics with the modeled time-correlation statistics;
   iteratively optimizing the expansion coefficients; and
   using the expansion coefficients to estimate the channel response.

6. The method of claim 1, wherein the set of filter coefficients further includes a set of precursor filter coefficients and a set of postcursor filter coefficients.

7. The method of claim 6, wherein the step of calculating further includes:
   computing a vector of channel response samples based at least in part on the estimated channel response;
   computing a time-correlation matrix based at least in part on the estimated channel response;
   determining an optimal set of the precursor filter coefficients through a function that includes at least the vector of channel response samples and the time correlation matrix; and
   determining an optimal set of the postcursor coefficients through a function that includes at least the optimal set of the precursor filter coefficients and the estimated channel response.

8. The method of claim 1, wherein the calculating step includes determining a set of filter coefficients that reduces channel dispersion by optimizing portions of the estimated channel response.

9. The method of claim 1, further comprising:
   determining a data clock of the electrical signal based at least in part on the filtered signal.

10. An optoelectronic assembly for reducing interference in an optical data stream received over a channel, the optoelectronic assembly comprising:
    a converter to convert the optical data stream to an electrical signal;
    an equalizer to filter the electrical data stream and to generate a filtered signal, the equalizer having a set of filter coefficients;
    a microcontroller comprising:
    logic for generating one or more correlation statistics for the electrical signal, each correlation statistic reducing data components of the electrical signal;
    logic for estimating a channel response reflecting dispersion in the channel, the estimated channel response being based at least in part on the one or more correlation statistics;
    logic for determining the set of filter coefficients for the equalizer; based at least in part on the estimated channel response; and
    logic for adaptively updating the set of filter coefficients for the equalizer to reflect time-varying changes in the channel response; and
    a comparator to compare the filtered signal against a threshold value to generate a plurality of data values for the optical data stream.

11. The optoelectronic assembly of claim 10, wherein the equalizer is an infinite impulse response (IIR) equalizer.

12. The optoelectronic assembly of claim 11, wherein the equalizer includes a minimum mean squared error (MMSE) filter.

13. The optoelectronic assembly of claim 10, wherein the equalizer does not require a training sequence to converge.

14. The optoelectronic assembly of claim 10, wherein the logic for estimating a channel response uses the plurality of time-correlation statistics to determine spacing between, and amplitudes of, a plurality of modeled channel-response peaks.

15. The optoelectronic assembly of claim 10, wherein the logic for estimating a channel response further comprises:
    logic for modeling the plurality of time-correlation statistics using a plurality of expansion coefficients;
    logic for comparing the computed time-correlation statistics with the modeled time-correlation statistics;
    logic for iteratively optimizing the expansion coefficients; and logic for using the expansion coefficients to estimate the channel response.

16. The optoelectronic assembly of claim 10, wherein the set of filter coefficients further includes a set of precursor filter coefficients and a set of postcursor filter coefficients.

17. The optoelectronic assembly of claim 16, wherein the logic for determining the set of filter coefficients further includes: logic for computing a vector of channel response samples based at least in part on the estimated channel response; logic for computing a time-correlation matrix based at least in part on the estimated channel response;

logic for determining an optimal set of the precursor filter coefficients through a function that includes at least the vector of channel response samples and the time-correlation matrix; and logic for determining an optimal set of the postcursor coefficients through a function that includes at least the optimal set of the precursor filter coefficients and the estimated channel response.

18. The optoelectronic assembly of claim 10, wherein the logic for determining the set of filter coefficients further determines a set of filter coefficients that reduces channel dispersion by minimizing portions of the estimated channel response.

19. The optoelectronic assembly of claim 10, further comprising:

a data clock recovery circuit for determining a data clock of the electrical signal based at least in part on the filtered signal.

* * * * *